(12) United States Patent
Fan

(10) Patent No.: US 11,120,789 B2
(45) Date of Patent: Sep. 14, 2021

(54) TRAINING METHOD OF HYBRID FREQUENCY ACOUSTIC RECOGNITION MODEL, AND SPEECH RECOGNITION METHOD

(71) Applicant: YUTOU TECHNOLOGY (HANGZHOU) CO., LTD., Hangzhou (CN)

(72) Inventor: Lichun Fan, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 133 days.

(21) Appl. No.: 16/487,819

(22) PCT Filed: Jan. 26, 2018

(86) PCT No.: PCT/CN2018/074320
§ 371 (c)(1),
(2) Date: Aug. 21, 2019

(87) PCT Pub. No.: WO2018/153214
PCT Pub. Date: Aug. 30, 2018

(65) Prior Publication Data
US 2020/0380954 A1 Dec. 3, 2020

(30) Foreign Application Priority Data
Feb. 27, 2017 (CN) .......................... 201710108893.5

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/142* (2013.01); *G10L 15/16* (2013.01); *G10L 25/21* (2013.01); *G10L 25/24* (2013.01)

(58) Field of Classification Search
CPC ......... G10L 15/02; G10L 15/14; G10L 15/07; G10L 15/16; G10L 15/063; G10L 15/142;
(Continued)

(56) References Cited

U.S. PATENT DOCUMENTS 7,089,178 B2 * 8/2006 Garudadri ............... G10L 15/02
704/202
2003/0009327 A1 1/2003 Nilsson et al.
(Continued)

FOREIGN PATENT DOCUMENTS

CN 1503968 A 8/2005
CN 101014997 A 8/2007
(Continued)

OTHER PUBLICATIONS

Li et al., "Improving wideband speech recognition using mixed-bandwidth training data in CD-DNN-HMM", Proc. Spoken Lang. Technol. Workshop, pp. 131-136, 2012 (Year: 2012).*
(Continued)

*Primary Examiner* — Michelle M Koeth
(74) *Attorney, Agent, or Firm* — Getech Law LLC; Jun Ye

(57) ABSTRACT

The invention discloses a training method and a speech recognition method for a mixed frequency acoustic recognition model, which belongs to the technical field of speech recognition. The method comprises: obtaining a first-type speech feature of the first speech signal, and processing the first speech data to obtain corresponding first speech training data (S1); obtaining the first-type speech feature of the second speech signal, and processing the second speech data to obtain corresponding second speech training data (S2); obtaining a second-type speech feature of the first speech signal according to a power spectrum of the first speech signal, and obtaining the second-type speech feature of the second speech signal according to a power spectrum of the second speech signal (S3); performing pre-training according to the first speech signal and the second speech signal, so as to form a preliminary recognition model of the hybrid frequency acoustic recognition model (S4); and performing supervised parameter training on the preliminary recogni-
(Continued)

tion model according to the first speech training data, the second speech training data and the second-type speech feature, so as to form the hybrid frequency acoustic recognition model (S5). The beneficial effects of the above technical solution are: the recognition model has better robustness and generalization.

14 Claims, 4 Drawing Sheets

(51) Int. Cl.
*G10L 15/14* (2006.01)
*G10L 15/16* (2006.01)
*G10L 25/21* (2013.01)
*G10L 25/24* (2013.01)

(58) Field of Classification Search
CPC ......... G10L 25/24; G10L 25/21; G10L 25/30; G10L 19/02; G06N 3/02
See application file for complete search history.

(56) References Cited

U.S. PATENT DOCUMENTS

| | | | |
|---|---|---|---|
| 2009/0012785 | A1 | 1/2009 | Chengalvarayan |
| 2018/0040336 | A1* | 2/2018 | Wu .................. G10L 19/26 |

FOREIGN PATENT DOCUMENTS

| | | |
|---|---|---|
| CN | 101320560 A | 12/2008 |
| CN | 105513590 A | 4/2016 |
| CN | 105590625 A | 5/2016 |

OTHER PUBLICATIONS

Yu Gu and Z. Ling, "Restoring high frequency spectral envelopes using neural networks for speech bandwidth extension," 2015 International Joint Conference on Neural Networks (IJCNN), Killarney, Ireland, 2015, pp. 1-8, doi: 10.1109/IJCNN.2015.7280483. (Year: 2015).*

Seltzer et al., "Training wideband acoustic models using mixed-bandwidth training data via feature bandwidth extension," Proceedings. (ICASSP '05). IEEE International Conference on Acoustics, Speech, and Signal Processing, 2005., Phila., PA, USA, 2005, p. I/921-I/924 doi:V10.1109/ICASSP.2005.1415265 (Year: 2005).*

Jianqing Gao et al., "An experimental study on joint modeling of mixed-bandwidth data via deep neural networks for robust speech recognition," 2016 International Joint Conference on Neural Networks (IJCNN), Vancouver, BC, Canada, 2016, pp. 588-594, doi: 10.1109/IJCNN.2016.7727253. (Year: 2016).*

Seltzer et al., "Training Wideband Acoustic Models Using Mixed-Bandwidth Training Data for Speech Recognition," in IEEE Transactions on Audio, Speech, and Language Processing, vol. 15, No. 1, pp. 235-245, Jan. 2007, doi: 10.1109/TASL.2006.876774 (Year: 2007).*

Wang et al., "A Joint Training Framework for Robust Automatic Speech Recognition," in IEEE/ACM Transactions on Audio, Speech, and Language Processing, vol. 24, No. 4, pp. 796-806, Apr. 2016, doi: 10.1109/TASLP.2016.2528171. (Year: 2016).*

Ling et al., "Modeling Spectral Envelopes Using Restricted Boltzmann Machines and Deep Belief Networks for Statistical Parametric Speech Synthesis," in IEEE Transactions on Audio, Speech, and Language Processing, vol. 21, No. 10, pp. 2129-2139, Oct. 2013, doi: 10.1109/TASL.2013.2269291 (Year: 2013).*

Maas et al., "Building DNN Acoustic Models for Large Vocabulary Speech Recognition," arXiv:1406.7806v2 [cs.CL], Jan. 20, 2015. (Year: 2015).*

Gu et al., "Speech Bandwidth Extension Using Bottleneck Features and Deep Recurrent Neural Networks," Interspeech 2016, San Francisco, USA, Sep. 12, 2016, pp. 297-301 (Year: 2016).*

Bauer et al., "Automatic recognition of wideband telephone speech with limited amount of matched training data," 2014 22nd European Signal Processing Conference (EUSIPCO), Lisbon, Portugal, 2014, pp. 1232-1236 (Year: 2014).*

PCT/CN2018/074320—International Search Report, dated Apr. 23, 2018, 4 pages in Chinese, 3 pages English translation.

Hokking, et al., Speech Recognition of Different Sampling Rates Using Fractal Code Descriptor, 2016, 13th International Joint Conference on Computer Science and Software Engineering, 5 pages.

PCT/CN2018/074320—Written Opinion, dated Apr. 23, 2018, 3 pages.

201710108893.5, Official Action dated Feb. 28, 2020, 12 Pages. (English Translation).

* cited by examiner

TRAINING METHOD OF HYBRID FREQUENCY ACOUSTIC RECOGNITION MODEL, AND SPEECH RECOGNITION METHOD

FIELD OF THE INVENTION

The present invention relates to the field of speech recognition technology, and in particular to a training method of a hybrid frequency acoustic recognition model, and a speech recognition method.

BACKGROUND OF THE INVENTION

In the prior art, there are large differences between different recording devices and storage methods due to different use environments, data transmission requirements and technical means for transmission, wherein the relatively main difference is the difference in sampling frequency. For example, speech data of 8 kHz sampling frequency are usually from telephone recording, then an acoustic recognition model of 8 kHz data is especially formed by using telephone data training in the conventional speech recognition method. Correspondingly, the speech data of 16 kHz sampling frequency are usually from desktop recording, and an acoustic recognition model of 16 kHz data is similarly formed by using desktop data training. Therefore, the traditional acoustic recognition method for speech data of hybrid sampling frequency is to establish acoustic recognition models for the speech data of different sampling frequencies in different environments respectively.

Although a test environment can better match a training environment by using the dedicated acoustic models, many drawbacks are brought accordingly: first, the update and maintenance of the recognition model is very cumbersome, and it is necessary to perform dedicated update and maintenance for each dedicated acoustic model; and second the training data of the models are insufficient due to the respective training of each dedicated acoustic model, and the robustness and generalization of the model are also limited.

SUMMARY OF THE INVENTION

According to the above problems existing in the prior art, the technical solution of a training method of a hybrid frequency acoustic recognition model, and a speech recognition method is provided, so as to form a unified acoustic recognition model for speech signals of different sampling frequencies, so that the model has better robustness and generalization for data of different sampling frequencies, and can better suppress the influence of environmental noise on speech recognition.

The above technical solution specifically includes:

A training method of a hybrid frequency acoustic recognition model, wherein a unified hybrid frequency acoustic recognition model is formed by training to respectively perform acoustic recognition on a first speech signal having a first sampling frequency and to perform the acoustic recognition on a second speech signal having a second sampling frequency;

the training method of the hybrid frequency acoustic recognition model specifically includes:

step S1, obtaining a first-type speech feature of the first speech signal, and processing the first speech data to obtain corresponding first speech training data;

step S2, obtaining the first-type speech feature of the second speech signal, and processing the second speech data to obtain corresponding second speech training data;

step S3, obtaining a second-type speech feature of the first speech signal according to a power spectrum of the first speech signal, and obtaining the second-type speech feature of the second speech signal according to a power spectrum of the second speech signal;

step S4, performing pre-training according to the first speech signal and the second speech signal, so as to form a preliminary recognition model of the hybrid frequency acoustic recognition model; and step S5, performing supervised parameter training on the preliminary recognition model according to the first speech training data, the second speech training data and the second-type speech feature, so as to form the hybrid frequency acoustic recognition model.

Preferably, according to the training method, the first sampling frequency is a sampling frequency of 16 KHz.

Preferably, according to the training method, the second sampling frequency is a sampling frequency of 8 KHz.

Preferably, according to the training method, the first-type speech feature is an MFCC feature.

Preferably, according to the training method, the second-type speech feature is a fbank feature.

Preferably, according to the training method, in the step S1, the method for processing the first speech signal to obtain the first speech training data specifically includes:

step S11, performing training by using the first-type speech feature to form a first acoustic model; and step S12, performing a forced alignment operation on the first speech signal by using the first acoustic model to form the frame-aligned first speech training data.

Preferably, in the training method, in the step S2, the first-type speech feature of the second speech signal is obtained by using a triphone decision tree the same as the first acoustic model.

Preferably, according to the training method, in the step S2, the method for processing the second speech signal to obtain the second speech training data specifically includes:

step S21, performing training by using the second-type speech feature to form a second acoustic model; and step 22, performing the forced alignment operation on the second speech signal by using the second acoustic model to form the frame-aligned second speech training data.

Preferably, according to the training method, the first acoustic model is a GMM-HMM acoustic model.

Preferably, according to the training method, the second acoustic model is a GMM-HMM acoustic model.

Preferably, according to the training method, the first sampling frequency of the first speech signal is 16 kHz;

in the step S3, the method for obtaining the second-type speech feature in the first speech signal specifically includes:

step S31a, obtaining the power spectrum of the first speech signal;

step S32a, using a Mel filter bank to normalize a signal portion of a high frequency band of the first speech signal according to the power spectrum of the first speech signal to obtain a high frequency portion of the second-type speech feature of the first speech signal;

step S33a, using the Mel filter bank to normalize the signal portion of a low frequency band of the first speech signal according to the power spectrum of the first speech signal to obtain a low frequency portion of the second-type speech feature of the first speech signal; and step S34a, combining the high frequency portion with the low frequency portion to obtain the second-type speech feature of the first speech signal.

Preferably, according to the training method, the second sampling frequency of the second speech signal is 8 kHz;

in the step S3, the method for obtaining the second-type speech feature in the second speech signal specifically includes:

step S31b, obtaining the power spectrum of the second speech signal;

step S32b, using the Mel filter bank to normalize the second speech signal according to the power spectrum of the second speech signal to obtain a low frequency portion of the second-type speech feature of the second speech signal;

step S33b, performing high-dimensional zero padding processing on the second speech signal to obtain the high frequency portion of the second-type speech feature of the second speech signal; and step S34b, combining the high frequency portion with the low frequency portion to obtain the second-type speech feature of the second speech signal.

Preferably, according to the training method, the hybrid frequency acoustic recognition model is a partially connected deep neural network model; or the hybrid frequency acoustic recognition model is a fully connected deep neural network model.

Preferably, according to the training method, in the step S4, the deep neural network model is pre-trained by using a restricted Boltzmann machine according to the first speech signal and the second speech signal to form the preliminary recognition model of the hybrid frequency acoustic recognition model.

Preferably, in the training method, in the step S5, the supervised parameter training is performed on the preliminary recognition model by using a stochastic gradient descent method according to the first speech training data, the second speech training data and the second-type speech feature, so as to form the hybrid frequency acoustic recognition model.

A speech recognition method, wherein the above training method of the hybrid frequency acoustic recognition model is employed.

The above technical solution has the beneficial effect that: a training method of the hybrid frequency acoustic recognition model is provided, by which a unified acoustic recognition model can be formed for speech signals of different sampling frequencies, so that the model has better robustness and generalization for data of different sampling frequencies, and can better suppress the influence of environmental noise on speech recognition.

DETAILED DESCRIPTION OF THE EMBODIMENTS

The present invention is further illustrated below in combination with the drawings and specific embodiments, but the present invention is not limited thereto.

Based on the above problems existing in the prior art, a training method of a hybrid frequency acoustic recognition model is provided. In the method, a unified hybrid frequency acoustic recognition model is formed by training to respectively perform acoustic recognition on a first speech signal having a first sampling frequency and to perform the acoustic recognition on a second speech signal having a second sampling frequency. In other words, in the training method, for a plurality of speech data of different sampling frequencies, a unified acoustic recognition model is formed by training to perform recognition, instead of forming a dedicated acoustic recognition model for each speech data by training to perform recognition as in the conventional method.

Figure 1:
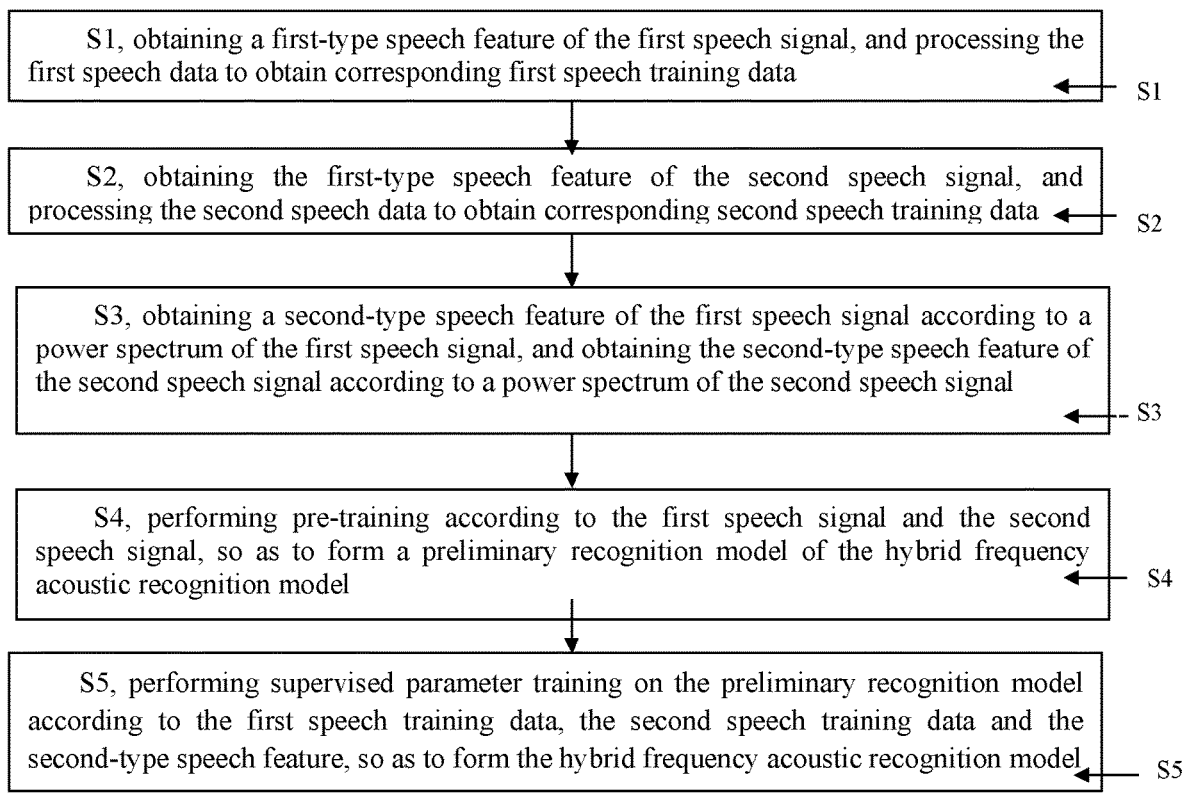
FIG. 1 is a schematic diagram of an overall flow of a training method of a hybrid frequency acoustic recognition model in a preferred embodiment of the present invention.

The above training method, specifically as shown in FIG. 1, includes:

step S1, obtaining a first-type speech feature of the first speech signal, and processing the first speech data to obtain corresponding first speech training data;

step S2, obtaining the first-type speech feature of the second speech signal, and processing the second speech data to obtain corresponding second speech training data;

step S3, obtaining a second-type speech feature of the first speech signal according to a power spectrum of the first speech signal, and obtaining the second-type speech feature of the second speech signal according to a power spectrum of the second speech signal;

step S4, performing pre-training according to the first speech signal and the second speech signal, so as to form a preliminary recognition model of a hybrid frequency acoustic recognition model; and step S5, performing supervised parameter training on the preliminary recognition model according to the first speech training data, the second speech training data and the second-type speech feature, so as to form the hybrid frequency acoustic recognition model.

Specifically, in the present embodiment, it is necessary to respectively obtain the first-type speech features of the first speech signal and the second speech signal at first. The first-type speech feature of the first speech signal and the second-type speech feature of the second speech signal should be consistent, therefore respective processing should be performed by using the same triphone decision tree to obtain the first-type speech features of the first speech signal and the second speech signal. Further, the first-type speech feature is a Mel frequency cepstrum coefficient (Mel Frequency Cepstrum Coefficient, MFCC) feature, and the specific obtaining process is detailed below.

After the first-type speech feature is obtained, the corresponding first speech signal or the second speech signal is respectively processed according to the first-type speech feature to obtain the first speech training data or the second speech training data.

In the present embodiment, the second-type speech features of the first speech signal and the second speech signal are subsequently obtained, respectively. Further, the second-type speech feature is a thank feature, and the specific obtaining process is detailed below.

In the present embodiment, the first speech signal and the second speech signal are used as input data to pre-train the hybrid frequency acoustic recognition model to form a preliminary model, then supervised parameter training is performed on the preliminary model according to the first-type speech feature, the second-type speech feature, the first speech training data and the second speech training data, and the hybrid frequency acoustic recognition model is formed at last by training.

In a preferred embodiment of the invention, the first sampling frequency of the first speech signal is 16 kHz and is usually from telephone recording. The second sampling frequency of the second speech signal is 8 kHz and is usually from desktop recording.

Figure 2:
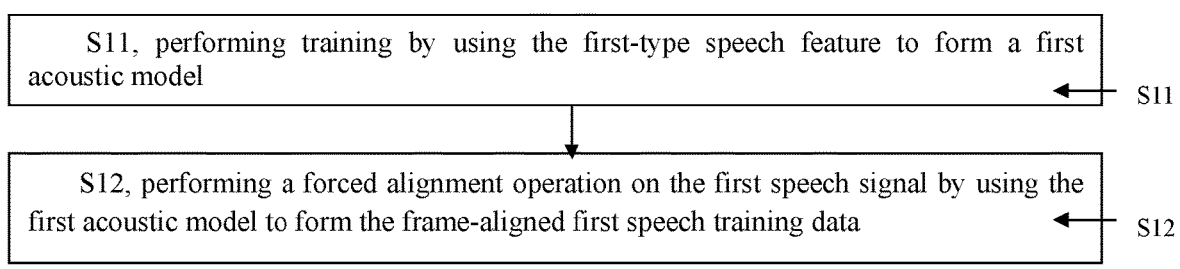
FIG. 2-FIG. 3 are flow schematic diagrams of performing training to obtain a first-type speech feature in a preferred embodiment of the present invention.

In a preferred embodiment of the present invention, in the step S1, as shown in FIG. 2, the method for processing the first speech signal to obtain the first speech training data specifically includes:

step S11, performing training by using the first-type speech feature to form a first acoustic model; and step S12, performing a forced alignment operation on the first speech signal by using the first acoustic model to form the frame-aligned first speech training data.

Specifically, in the present embodiment, the first-type speech feature (i.e., the MFCC feature) is extracted from the first speech signal at first, and then training is performed by using the first-type speech feature to form a first acoustic model. The MFCC feature is the most common speech feature in the field of speech recognition, the method for extracting the MFCC feature from the speech signal has a relatively mature implementation manner in the prior art, and thus they will not be described repeatedly herein.

In a preferred embodiment of the present invention, before the appearance of an acoustic model based on a DNN-HMM (Deep Neural Networks-Hidden Markov Model, deep neural networks-hidden Markov model) frame, the acoustic model based on a GMM-HMM (Gaussian Mixture Model-Hidden Markov Model, Gaussian mixture model-Hidden Markov model) frame is the most extensive configuration in the field of speech recognition. This kind of frame structure uses the hidden Markov model to perform transfer modelling on a triphone state and uses the Gaussian mixture model to perform transmission probability modelling on the state, and these states just correspond to output nodes of a deep neural network model. Therefore, when the hybrid frequency acoustic recognition model is the deep neural network model, the first acoustic model can be a GMM-HMM acoustic model, that is, a GMM-HMM acoustic model is formed by training by using the MFCC feature.

In the present embodiment, forced alignment is performed on the first speech signal by using the first acoustic model formed by the above training. The so-called forced alignment refers to corresponding each frame of speech features of the speech to a certain state of the bound triphone, and these states exactly correspond to the output nodes of the hybrid frequency acoustic recognition model. The supervised parameter training can be performed on the hybrid frequency acoustic recognition model (the deep neural network model) via the frame aligned data.

Figure 3:
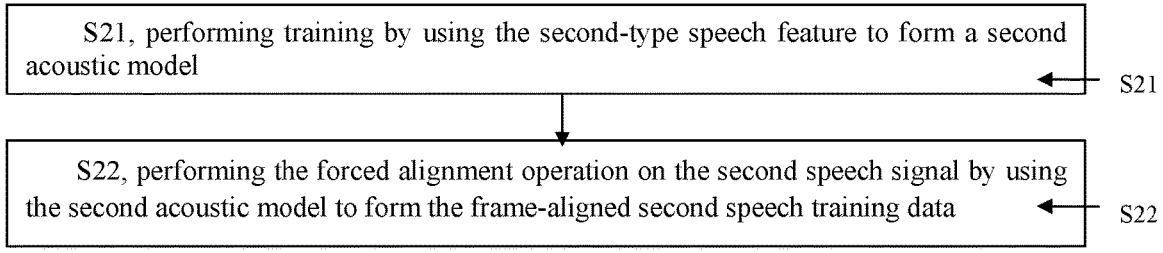

In a preferred embodiment of the present invention, similar to the above description, in the step S2, the method for processing the second speech signal to obtain the second speech training data, as shown in FIG. 3, specifically includes:

step S21, performing training by using the second-type speech feature to form a second acoustic model; and step S22, performing the forced alignment operation on the second speech signal by using the second acoustic model to form the frame-aligned second speech training data.

The process of obtaining and training the second-type speech feature to form the second acoustic model, and then performing the forced alignment operation on the second speech signal by using the second acoustic model is similar to the above operation for the first speech signal, and thus will not be described herein again.

It should be noted that, since the speech features of 16 kHz speech and 8 kHz speech have great differences, and the frequency domain covered by each dimension is different, the two speech data cannot share the same GMM-HMM model, furthermore, since the same hybrid frequency acoustic recognition model needs to be formed by the co-training of the 16 kHz speech data and the 8 kHz speech data, the frame-aligned output nodes of the two speech data are kept consistent. Then, when the second-type speech feature is extracted from the second speech signal, the same triphone decision tree as the first acoustic model is employed for extraction, that is, the phone set and the decision tree used for extracting the first-type speech features from the first speech signal and the second speech signal are the same.

Figure 4:
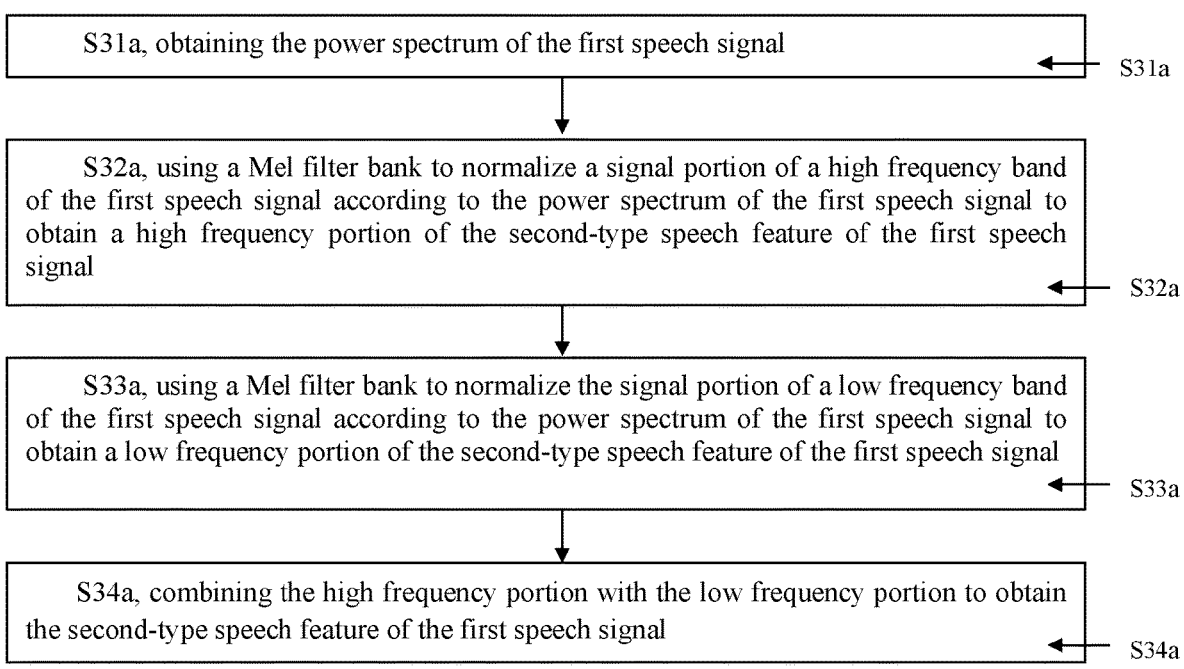
FIG. 4-FIG. 5 are flow schematic diagrams of performing training to obtain a second-type speech feature in a preferred embodiment of the present invention.

In a preferred embodiment of the present invention, in the step S3, the method for obtaining the second-type speech feature in the first speech signal of 16 kHz, as shown in FIG. 4, specifically includes:

step S31a, obtaining the power spectrum of the first speech signal;

step S32a, using a Mel filter bank to normalize a signal portion of a high frequency band of the first speech signal according to the power spectrum of the first speech signal to obtain a high frequency portion of the second-type speech feature of the first speech signal;

step S33a, using a Mel filter bank to normalize the signal portion of a low frequency band of the first speech signal according to the power spectrum of the first speech signal to obtain a low frequency portion of the second-type speech feature of the first speech signal; and step S34a, combining the high frequency portion with the low frequency portion to obtain the second-type speech feature of the first speech signal.

Specifically, in the present embodiment, as described above, the second-type speech feature is a thank feature. Then, in the above steps, the power spectrum of the first speech signal is obtained at first, and then the high frequency band and the low frequency band of the first speech signal are normalized by using the Mel filter bank to obtain the fbank feature of the speech. Specifically, the method for obtaining the power spectrum of the speech signal is a processing process needing to be performed on all speech features, which generally requires pre-emphasis, framing, windowing and fast Fourier transform of the speech signal to obtain the frequency spectrum of the speech signal, and then the power spectrum is obtained.

Figure 6:
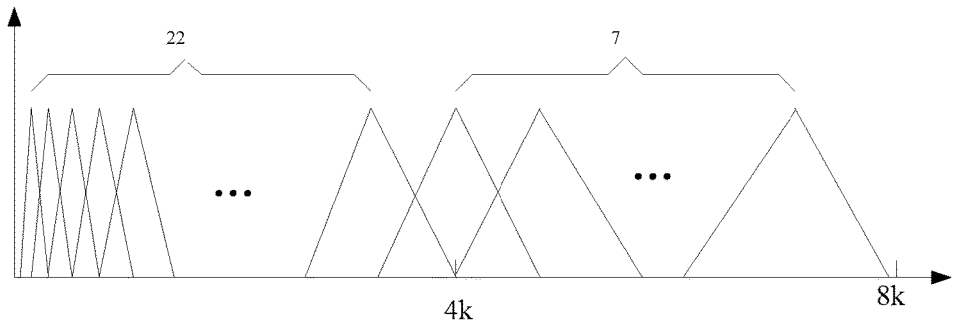
FIG. 6 is a schematic diagram of performing training by using a Mel filter bank to obtain a second-type speech feature in a preferred embodiment of the present invention.

In the present embodiment, in a common process of normalizing the power spectrum by using the Mel filter bank, a 24-dimensional Mel filter bank is generally employed for the 16 kHz speech data (the first speech signal), and a 8-dimensional Mel filter bank is generally employed for the 8 kHz speech data (the second speech signal). In the present invention, the low frequency band portion of the first speech signal is normalized by using a 22-dimensional Mel filter bank to form the low frequency portion, the high frequency band portion of the first speech signal is normalized by using 7-dimensional Mel filter bank to form the high frequency portion, and then the low frequency portion and the high frequency portion are summarized to form the second-type speech feature (specifically as shown in FIG. 6).

Figure 5:
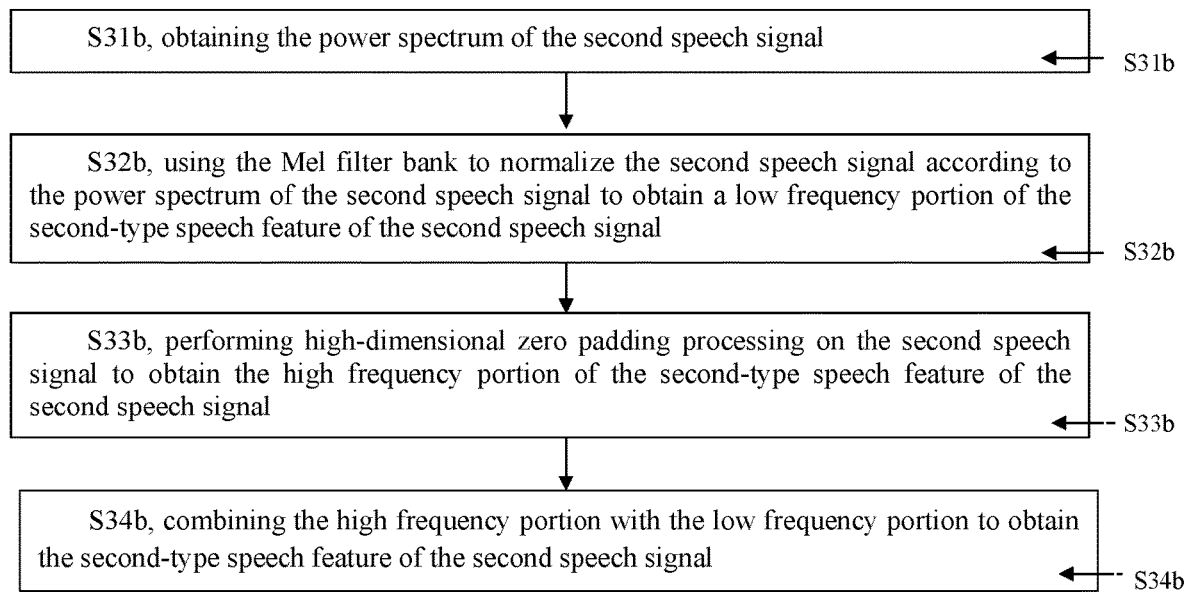

In a preferred embodiment of the present invention, in the step S3, the method for obtaining the second-type speech feature in the second speech signal of 8 kHz, as shown in FIG. 5, specifically includes:

step S31b, obtaining the power spectrum of the second speech signal;

step S32b, using a Mel filter bank to normalize the second speech signal according to the power spectrum of the second speech signal to obtain a low frequency portion of the second-type speech feature of the second speech signal;

step S33b, performing high-dimensional zero padding processing on the second speech signal to obtain the high frequency portion of the second-type speech feature of the second speech signal; and step S34b, combining the high frequency portion with the low frequency portion to obtain the second-type speech feature of the second speech signal.

The manner of obtaining the power spectrum of the second speech signal is the same as that of the first speech signal and is a generally used manner in the prior art, so that details are not described herein again.

In the present embodiment, since the second speech signal of 8 kHz has no high frequency band, only a 22-dimensional feature is obtained after the processing of the Mel filter bank. In order to make the second speech signal and the first speech signal have the same length of speech features, after the second speech signal is normalized by using the Mel filter bank, high-dimensional zero padding processing is performed thereon, that is, the high frequency band thereof is supplemented by zero, and thus the second-type speech feature is formed as well.

After the above processing, the second-type speech feature of the second speech signal has the same length as the second-type speech feature of the first speech signal, and the speech features can be shared at the low frequency band.

In a preferred embodiment of the invention, the hybrid frequency acoustic recognition model is a partially connected or fully connected deep neural network model.

Specifically, the fully connected deep neural network model cannot separately process noise interference from different frequency bands in the speech. Therefore, a partially connected deep neural network model can be provided, the partially connected deep neural network model includes at least one partially connected hidden layer, each partially connected hidden layer 71 only accepts input data from a specific frequency band, and these input data are not overlapped with each other. The high-level partial connection layer also accepts only the input data from the underlying partial connection layer. In this way, there is no mutual influence between each group of frequency bands, so that each neural network can separately process the noise in the corresponding frequency band. A plurality of fully connected neuron layers are located above the partially connected neuron layer, which can perform combination processing on the input data corresponding to each group of frequency bands, and finally form a feature combination with expressive ability, and then an output result is obtained.

Figure 7:
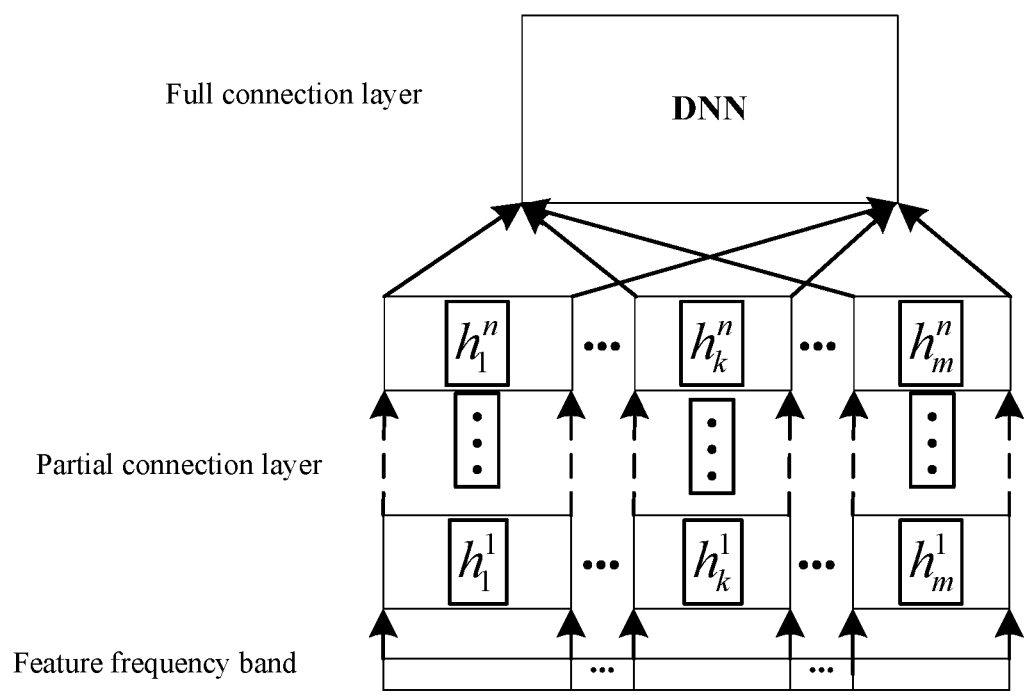
FIG. 7 is a structural schematic diagram of using a partially connected deep neural network as a hybrid frequency acoustic recognition model in a preferred embodiment of the present invention.

In a preferred embodiment of the present invention, a neural network structure of the partially connected deep neural network is shown in FIG. 7. If the input speech feature is divided into m frequency band portions, it is expressed as:

$$V=[v_1, v_2, \ldots, v_m]; \quad (1)$$

then, the above partially connected hidden layer is also divided into m portions, then the portions of the partially connected hidden layer of the $n^{th}$ portion are expressed as:

$$H_n=[h_{n1}, h_{n2}, \ldots, h_{nm}]; \quad (2)$$

then, the value $h_k^n$ of the kth portion can be calculated via the value of the $k^{th}$ portion of the first layer, specifically:

$$h_k^n = \theta(w_k^n v_k^n + b_k^n); \quad (3)$$

wherein, $\theta(*)$ represents an activation function;

$w_k^n$ represents a weight matrix of the $k^{th}$ portion of the $n^{th}$ partially connected hidden layer; and $b_k^n$ represents an offset amount of the $k^{th}$ portion of the $n^{th}$ partially connected hidden layer.

In the present invention, the partially connected deep neural network and the fully connected deep neural network have the same training method, and when the partial connection layer of the partially connected neural network is trained, it can be regarded as pre-training a plurality of mutually separated deep neural networks. In the present invention, the partially connected deep neural network can be used as the hybrid frequency acoustic recognition model to improve its anti-noise performance, effectively suppress various environmental noise, and obtain better recognition performance than the ordinary fully connected deep neural network.

In the present invention, the fully connected deep neural network can also be used as the hybrid frequency acoustic recognition model, which is slightly inferior to the partially connected deep neural network in the anti-noise performance.

As described above, the partially connected deep neural network and the fully connected deep neural network have the same training steps, so that the training processes of the fully connected deep neural network and the partially connected deep neural network are not respectively described one by one below.

In a preferred embodiment of the present invention, in the step S4, the deep neural network model is pre-trained by using a restricted Boltzmann machine according to the first speech signal and the second speech signal to form the preliminary recognition model of the hybrid frequency acoustic recognition model.

Specifically, in the present embodiment, taking the partially connected deep neural network as an example, for the second-type speech feature, the partial connection layer respectively corresponds to the low frequency portion and the high frequency portion of the second-type speech feature by using two portions, that is, 0-4 kHz corresponds to the low frequency portion, and 4-8 kHz corresponds to the high frequency portion. Thereafter, the low frequency portion of the thank feature is input to the first portion of the partial connection layer, the high frequency portion of the thank feature is input to the second portion of the partial connection layer, and finally the partially connected deep neural network is pre-trained by using the restricted Boltzmann machine (Restricted Boltzmann Machine, RBM) to form the preliminary model of the hybrid frequency acoustic recognition model.

In a preferred embodiment of the present invention, in the step S5, the supervised parameter training can be performed on the preliminary recognition model by using a stochastic gradient descent method according to the first speech training data, the second speech training data and the second-type speech feature, so as to form the hybrid frequency acoustic recognition model.

Specifically, in the present embodiment, the supervised optimized training can be performed on the entire preliminary recognition model by using the stochastic gradient descent method (Stochastic Gradient Descent, SGD) method. Specifically, the supervised training is performed on the preliminary model by using the thank feature and the frame-aligned first speech training data and the second speech training data. The performance of the model can be observed by using a development set of real data in the training process. The test performance of the development set will gradually become better with the iteration of the model. When the performance increase of the development set becomes slower and the absolute performance increase of the twice model iterations on the development set is less than a predetermined threshold, the training is stopped. The trained model at this time is the finally completed hybrid frequency acoustic recognition model. According to this model, the first speech signal of 16 kHz and the second speech signal of 8 kHz can be respectively recognized, thereby improving the robustness and generalization of the model. When the hybrid frequency acoustic recognition model is formed by training the partially connected deep neural network model, its anti-noise performance is also improved, various environmental noise can be effectively suppressed, and the recognition performance is further improved.

The foregoing descriptions are merely preferred embodiments of the present invention, and thus are not intended to limit the implementation manner or the protection scope of the present invention, and those skilled in the art should be aware that all solutions obtained by making equivalent substitutions and obvious variations on the basis of the specification of the present invention and the contents shown in the figures shall fall within the protection scope of the present invention.

What is claimed is:

1. A training method of a hybrid frequency acoustic recognition model, wherein a unified hybrid frequency acoustic recognition model is formed by training to respectively perform acoustic recognition on a first speech signal having a first sampling frequency and to perform the acoustic recognition on a second speech signal having a second sampling frequency;
   the training method of the hybrid frequency acoustic recognition model specifically comprises:
   step S1, obtaining a first-type speech feature of the first speech signal, and processing first speech data to obtain corresponding first speech training data, wherein the processing the first speech data includes
      step S11, performing training by using the first-type speech feature to form a first acoustic model; and
      step S12, performing a forced alignment operation on the first speech signal by using the first acoustic model to form frame-aligned first speech training data by associating each frame of speech features of the first speech signal to a state of a bound triphone, wherein the state of the bound triphone corresponds to an output node of the hybrid frequency acoustic recognition model;
   step S2, obtaining the first-type speech feature of the second speech signal, and processing second speech data to obtain corresponding second speech training data;
   step S3, obtaining a second-type speech feature of the first speech signal according to a power spectrum of the first speech signal, and obtaining the second-type speech feature of the second speech signal according to a power spectrum of the second speech signal,
      wherein both the first speech signal and the second speech signal include a respective low frequency band,
      wherein the first speech signal includes a high frequency band but the second speech signal lacks data in the high frequency band,
      wherein the obtaining the second-type speech feature of the second speech signal according to the power spectrum of the second speech signal further includes:
         filling the high frequency band of the second speech signal with one or more zero values such that the lengths of the first speech signal and the second speech signal are the same;
   step S4, inputting the first speech signal and the second speech signal to a deep neural network, pre-training the deep neural network so as to form a preliminary recognition model of the hybrid frequency acoustic recognition model; and
   step S5, performing supervised parameter training on the preliminary recognition model according to the first speech training data, the second speech training data and the second-type speech feature, so as to form the hybrid frequency acoustic recognition model.

2. The training method according to claim 1, wherein the first sampling frequency is a sampling frequency of 16 KHz.

3. The training method according to claim 1, wherein the second sampling frequency is a sampling frequency of 8 KHz.

4. The training method according to claim 1, wherein the first-type speech feature is a Mel Frequency Cepstrum Coefficient (MFCC) feature.

5. The training method according to claim 1, wherein the second-type speech feature is a filterbank (fbank) feature.

6. The training method according to claim 1, wherein in the step S2, the first-type speech feature of the second speech signal is obtained by using a triphone decision tree the same as the first acoustic model.

7. The training method according to claim 1, wherein in the step S2, the method for processing the second speech signal to obtain the second speech training data specifically comprises:
   step S21, performing training by using the second-type speech feature to form a second acoustic model; and
   step S22, performing a forced alignment operation on the second speech signal by using the second acoustic model to form frame-aligned second speech training data by associating each frame of speech features of the second speech signal to a state of a bound triphone, wherein the state of the bound triphone corresponds to an output node of the hybrid frequency acoustic recognition model.

8. The training method according to claim 1, wherein the first acoustic model is a Gaussian Mixture Model-Hidden Markov Model (GMM-HMM) acoustic model.

9. The training method according to claim 8, wherein the second acoustic model is a Gaussian Mixture Model-Hidden Markov Model (GMM-HMM) acoustic model.

10. The training method according to claim 1, wherein the first sampling frequency of the first speech signal is 16 kHz;

in the step S3, the method for obtaining the second-type speech feature in the first speech signal specifically comprises:

step S31a, obtaining the power spectrum of the first speech signal;

step S32a, using a Mel filter bank to normalize a signal portion of the high frequency band of the first speech signal according to the power spectrum of the first speech signal to obtain a high frequency portion of the second-type speech feature of the first speech signal;

step S33a, using the Mel filter bank to normalize the signal portion of the low frequency band of the first speech signal according to the power spectrum of the first speech signal to obtain a low frequency portion of the second-type speech feature of the first speech signal; and step S34a, combining the high frequency portion with the low frequency portion to obtain the second-type speech feature of the first speech signal.

11. The training method according to claim 1, wherein the second sampling frequency of the second speech signal is 8 kHz;

in the step S3, the method for obtaining the second-type speech feature in the second speech signal specifically comprises:

step S31b, obtaining the power spectrum of the second speech signal;

step S32b, using a Mel filter bank to normalize the second speech signal according to the power spectrum of the second speech signal to obtain a low frequency portion of the second-type speech feature of the second speech signal;

step S33b, performing high-dimensional zero padding processing on the second speech signal to obtain a high frequency portion of the second-type speech feature of the second speech signal; and step S34b, combining the high frequency portion with the low frequency portion to obtain the second-type speech feature of the second speech signal.

12. The training method according to claim 1, wherein the hybrid frequency acoustic recognition model is a partially connected deep neural network model; or the hybrid frequency acoustic recognition model is a fully connected deep neural network model.

13. The training method according to claim 12, wherein in the step S4, the deep neural network model is pre-trained by using a restricted Boltzmann machine according to the first speech signal and the second speech signal to form the preliminary recognition model of the hybrid frequency acoustic recognition model.

14. The training method according to claim 12, wherein in the step S5, the supervised parameter training is performed on the preliminary recognition model by using a stochastic gradient descent method according to the first speech training data, the second speech training data and the second-type speech feature, so as to form the hybrid frequency acoustic recognition model.

* * * * *